Oct. 8, 1974 S. A. J. LILJENDAHL Re. 28,189

METHOD OF CONDUCTING WASTE LIQUID BY VACUUM THROUGH LONG CONDUITS OF PNEUMATIC SEWAGE DISPOSAL SYSTEMS

Original Filed July 15, 1970 3 Sheets-Sheet 1

United States Patent Office

Re. 28,189
Reissued Oct. 8, 1974

28,189

METHOD OF CONDUCTING WASTE LIQUID BY VACUUM THROUGH LONG CONDUITS OF PNEUMATIC SEWAGE DISPOSAL SYSTEMS

Sven Algot Joel Liljendahl, Kallhall, Sweden, assignor to Aktiebolaget Electrolux, Stockholm, Sweden Original No. 3,686,693, dated Aug. 29, 1972, Ser. No. 55,090, July 15, 1970. Application for reissue Nov. 1, 1973, Ser. No. 411,831
Claims priority, application Sweden, Sept. 8, 1969, 12,367/69
Int. Cl. E03d *1/00, 3/00, 5/00*
U.S. Cl. 4—10 10 Claims

Matter enclosed in heavy brackets [ ] appears in the original patent but forms no part of this reissue specification; matter printed in italics indicates the additions made by reissue.

ABSTRACT OF THE DISCLOSURE

A pneumatic sewage system has a long main conduit for conducting waste liquid to a receiving tank at a partial vacuum. Waste liquid from sanitary conveniences flows through branch conduits to the main conduit, intermittently a flow control valve in each branch conduit opening when waste liquid starts to flow and closing when flow of liquid stops. When all of the valves close at the same time a long column of liquid being propelled at a high velocity in the main conduit to the receiving tank will suddenly stop. When this occurs forces are developed which adversely affect the main conduit and equipment connected thereto. In accordance with my invention ambient air is mixed with waste liquid in each branch only during the intervals of time waste liquid is flowing therethrough and while it is open. The ambient air mixed with the waste liquid functions as a resilient damper that effectively absorbs the forces developed when the long column of liquid moving through the main conduit suddenly stops.

BACKGROUND OF THE INVENTION

1. Field of the Invention

In pneumatic sewage systems waste liquid flows from sanitary conveniences through branch conduits to a relatively long main conduit. In the main conduit the waste liquid forms a long column of liquid which is propelled at a high velocity to a receiving tank at a partial vacuum.

2. Description of the Prior Art

In sewage systems of the type employed heretofore waste liquid is conducted by force of gravity through comparatively large size pipes having a continuous downward slope. Such sewage systems are very expensive to build and require a relatively long time to install. Pneumatic sewage systems operating under vacuum possess many advantages over conventional sewage systems in which gravity flow of waste liquid is effected. In pneumatic sewage systems pipes having a very small diameter can be employed. Further, such pipes can be installed so that they are inclined either upward or downward from the horizontal. In vacuum-operated sewage systems columns of waste liquid are propelled at relatively high velocity through the pipes by considerable force even when the receiving tank is maintained at a moderate partial vacuum. For this reason the high resistance to flow of waste liquid resulting from the use of small diameter pipes in pneumatic sewage systems is not objectionable which is not true in conventional gravity-type sewage systems in which the velocity of the waste liquid is relatively low.

An operating characteristic of vacuum-operated sewage systems is that long liquid columns of waste liquid propelled through a main pipe will suddenly stop when waste liquid is no longer being discharged into the main pipe from branch lines connected to sanitary conveniences. This produces forces of high magnitude which are objectionable because they exercise an adverse effect on the relatively long main pipe and equipment connected thereto.

SUMMARY OF THE INVENTION

My invention relates to a method of conducting waste liquid by vacuum through long conduits of pneumatic sewage systems.

It is an object of my invention to dampen the forces produced in a long main conduit of a pneumatic sewage system when a long liquid column being propelled therethrough by vacuum suddenly stops. I accomplish this by mixing air with waste liquid before such liquid is discharged into the long main conduit. The air mixed with the waste liquid functions as a resilient damper that effectively absorbs the forces developed when the long column of liquid being propelled through the main conduit stops.

DESCRIPTION OF THE PREFERRED EMBODIMENT

Figure 1:
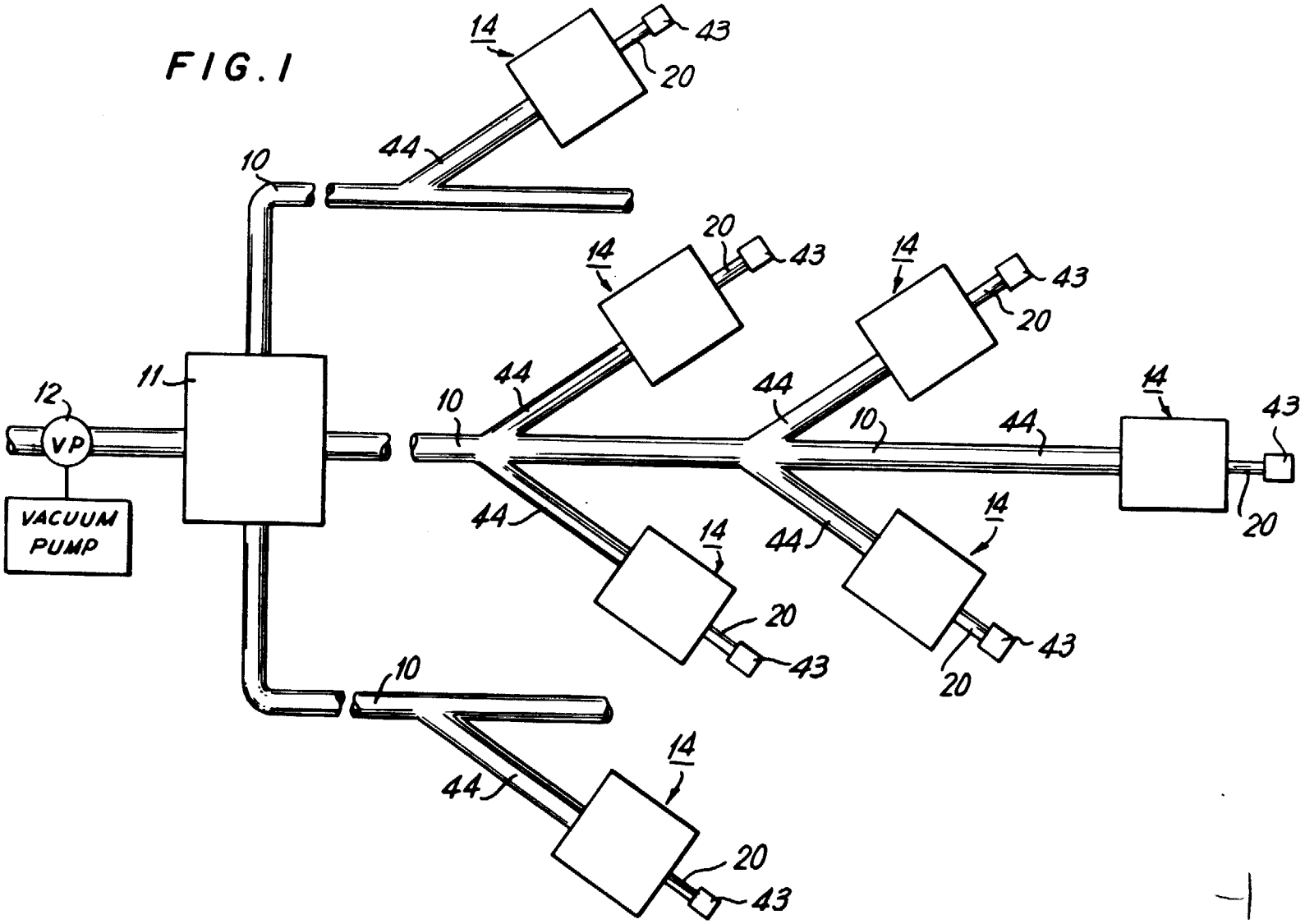
FIG. 1 is a schematic representation of a pneumatic sewage system embodying my invention.

In FIG. 1 I have shown my invention embodied in a pneumatic sewage system having a plurality of relatively long main conduits or pipe lines 10 for conducting waste liquid to a receiving tank 11 from sanitary conveniences 43, such as bathtubs and wash basins, for example. The pneumatic sewage system is maintained under partial vacuum which may be one-half of atmospheric pressure, for example, in any suitable manner. As seen in FIG. 1, a vacuum pump 12 is connected to the receiving tank 11.

The waste liquid from the sanitary conveniences 43 is conducted through branch pipe lines or secondary conduits 44 to the longer primary pipe lines 10. Flow control units 14 are interposed between the sanitary conveniences 43 and the branch pipe lines 44 for controlling the discharge of liquid from the sanitary conveniences 43 to the branch pipe lines.

Figure 2:
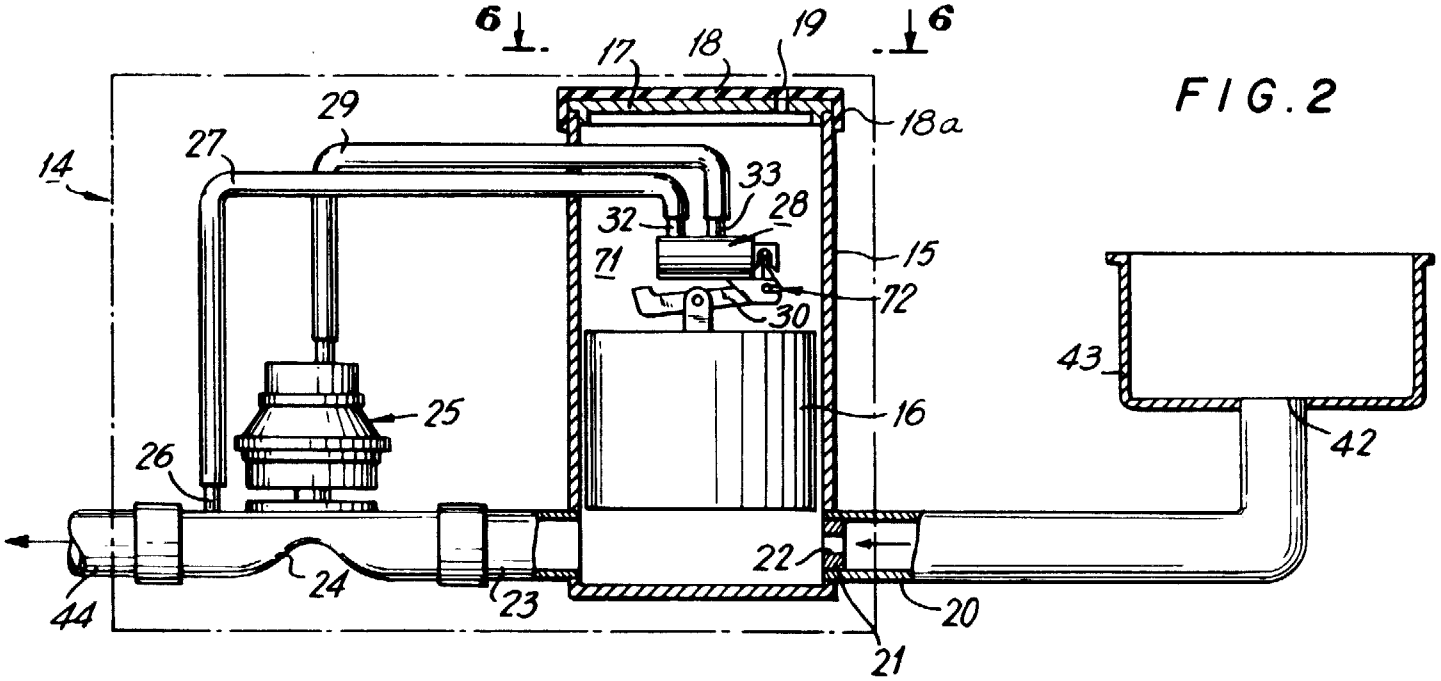
FIG. 2 is an elevation view, partly in section, of flow control structure which is schematically represented in FIG. 1 and embodies the invention for controlling the discharge of waste liquid from a place into the pneumatic sewage system.
Figure 6:
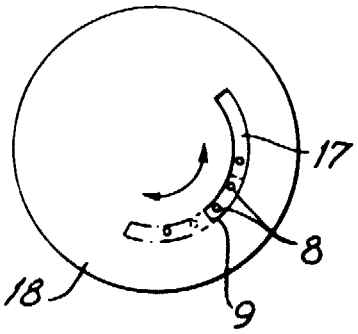
FIG. 6 is a fragmentary view taken at line 6—6 of FIG. 2.

As shown in FIG. 2, each flow control unit 14 includes a discharge conduit 23 for waste liquid having its discharge end connected to a branch pipe line 44 and its opposite inlet end connected to a conduit 20 through which liquid flows from an outlet 42 of a sanitary convenience or place 43.

Figure 4:
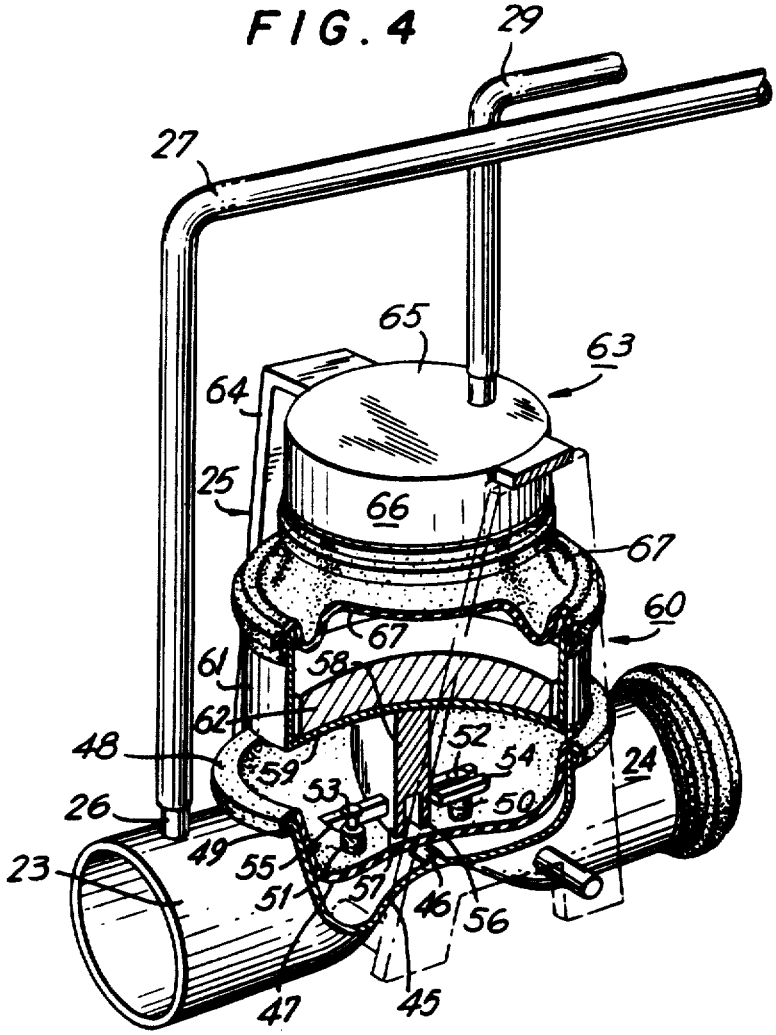
FIG. 4 is an enlarged perspective view, partly in section, of the pnuematically-operated valve unit shown in FIG. 2 which coacts with the float-operated valve mechanism.

Flow control structure is operatively associated with the discharge conduit 23 which opens when liquid starts to flow from the outlet 42 and closes when such flow of liquid stops. The flow control structure includes a main valve 24 coupled in the discharge conduit 23 at a region downstream from and in communication with the outlet 42. As seen in FIG. 4, the valve 24 is embodied in a section of the discharge conduit 23 having an oval-shaped opening in the top thereof and an inverted U-shaped bottom 45 at the region of such top opening. A ridge 46, which is transverse to the longitudinal axis of the conduit 23, extends inward therefrom about the conduit between the opposing edges of the top opening.

An elastic wall 47 of the shape shown in FIG. 4 is positioned at the top opening of the conduit 23. The elastic wall 47, which may be formed of rubber, for example, is provided with a flange 48 which fits in an air-tight manner over an outwardly bent edge 49 about the top opening in the conduit 23. The elastic wall 47 serves as a valve member of the valve 24 and is movable between closed and open positions to control the discharge of waste liquid from the discharge conduit 23 into the branch pipe line or conduit 44 forming a part of the pneumatic sewage system.

Figure 5:
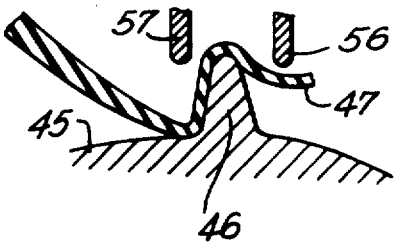
FIG. 5 is an enlarged fragmentary sectional view of parts shown in FIG. 4 to illustrate details more clearly.

A device 25 operates the main valve 24 and moves the elastic valve member 47 between its closed and open positions. In FIG. 4 it will be seen that the elastic valve member 47 is formed with bosses 50 and 51 in which lifting buttons 52 and 53 are vulcanized. The buttons 52 and 53 coact with pairs of spaced horizontal bars 54 and 55 which are fixed to and project from two arms 56 and 57 of the operating device 25. The arms 56 and 57 have bottom edges of semicircular form which, along their entire lengths, can engage the elastic valve member 47 and press the latter into sealing engagement with the bottom 45 of the conduit 23 at opposing sides of the ridge 46, as shown in FIG. 5.

The arms 56 and 57 are formed at the periphery of a plate 58 which depends downward from and is fixed to the bottom of an upright cylindrical-shaped vessel 60 having a side wall 61 and in which a metal weight 62 is positioned. Another inverted U-shaped vessel 63 is disposed above and spaced from the vessel 60.

The vessel 63 is supported in a fixed position in any suitable manner, as by a frame 64, for example, and includes a top 65 and a side wall 66 extending downward therefrom. The bottom edge of the side wall 66 of vessel 63 and the top edge of the side wall 61 of the vessel 60 are connected by a member 67 of annular shape which is formed of a suitable resilient material like rubber, for example. The annular-shaped member 67 is secured to the side walls 61 and 66 in an airtight manner.

When the operating device 25 is connected to a region at a partial vacuum in a manner that will be explained presently, the vessel 60 will move upward with respect to vessel 63 due to the resilient connection 67 therebetween. When this occurs the plate 58 and arms 56 and 57 will be moved upward and lift the buttons 52 and 53, thereby lifting the elastic valve member 47 from its closed or seated position in the conduit 23.

Conversely, when the operating device 25 is connected to a region at a higher pressure, such as atmospheric pressure, in a manner that will be explained presently, the vessel 60, with the aid of the weight 62, will move downward with respect to the vessel 63 due to the resilient connection between the vessels. When this occurs the plate 58 will be moved downward and the arms 56 and 57 will exert force against the elastic valve member 47 and move it firmly against the bottom 45 of the conduit 23 at opposing sides of the ridge 46.

The main valve 24 and operating device 25 just described are generally like those described in my U.S. Pat. No. 3,482,267, granted Dec. 9, 1969. The disclosure in my aforementioned patent may be considered as being incorporated in this application, and, if desired, reference may be made thereto for a detailed description of the main valve 24 and operating device 25.

The operating device 25 is connected by a conduit section 29, a control valve 28 and a conduit 27 to a region

26 of the discharge conduit 23 which is at a partial vacuum and downstream from the main valve 24. In a manner that will be described presently, the operating device 25 is connected by conduit section 29 and passageway means formed in the control valve 28 to a chamber 71 and will be influenced by the pressure prevailing in the latter which may be at a partial vacuum or at atmospheric pressure.

Figure 3:
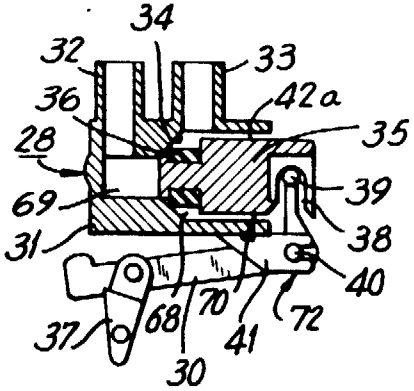
FIG. 3 is an enlarged fragmentary sectional view of the float-operated valve mechanism shown in FIG. 2.

As seen in FIG. 3 the control valve 28 comprises a hollow body 31 having a chamber 68 communicating with a passageway 69. The conduit section 29 is connected by a nipple 33 to the chamber 68 and the conduit section 27 is connected by a nipple 32 to the passageway 69. A valve member 70 comprising a cylindrical-shaped part 35 having a resilient sleeve or bushing 36 thereon is axially movable within the chamber 68. A wall of the chamber 68 serves as a seat 34 against which the bushing 36 bears when the valve 28 is in its illustrated closed position.

The valve member 70 is movable toward the right in FIG. 3 to its open position. In such open position the bushing 36 is moved from its seat 34 and the conduit sections 29 and 27 are in communication with one another through the chamber 68 and passageway 69 in the hollow body 31. As seen in FIG 3, the cylindrical-shaped member 35 is formed with an axially extending groove 42a at its periphery which provides a passageway from the chamber 68 within the hollow body 31 into the chamber 71 in which the control valve 28 is disposed.

In view of the foregoing, it will now be understood that when the valve member 70 of the control valve 28 is open and in one of its two operating positions with the bushing 36 moved from its seat 34, the conduit sections 27 and 29 and connection therebetween, which is formed by the chamber 68 and passageway 69 in the valve body 31, constitute means for connecting the operating device 25 of the main valve 24 to the region 26 of the discharge conduit 23 which is at a partial vacuum. When this occurs the elastic valve member 47 of the main valve 24 moves to its open position, as previously explained.

When the valve member 70 of the control valve 28 is closed and in the other of its two operating positions, the operating device 25 of the main valve 24 is disconnected from the region 26 of the discharge conduit 23. Under these conditions the operating device 25 of the main valve 24 is connected to the chamber 71 and influenced by the pressure prevailing therein which may be partial vacuum or atmospheric pressure, as will be explained hereinafter. This connection includes the conduit section 29, chamber 68 of the valve body 31 and the groove 42a in the cylindrical-shaped member 35.

The discharge conduit 23 includes a vessel 15 between the main valve 24 and the outlet 42 which defines the chamber 71 having a float 16 therein which is operatively connected by mechanism 72 to the control valve 28. The mechanism 72 includes a vertically disposed link 37 having its lower end pivotally connected to the top of the float 16 in any suitable manner (not shown). The upper end of the link 37 is pivotally connected to a horizontally extending arm of an L-shaped lever 30 at a region intermediate its ends. The lever 30 at the bend thereof is provided with a pin 40 which is journaled in an opening of a stationary plate 41 mounted on the hollow body 31 of the control valve 28.

The outer end of the cylindrical-shaped part 35 of the valve member 70 is formed with a recess 38 which receives the upper end 39 of the vertically disposed arm of the L-shaped lever 30. The mechanism 72 just described functions in such manner that the part 35 moves to the left in FIG. 3 toward the closed position of the valve 28 responsive to downward movement of the float 16. Conversely, the part 35 moves to the right in FIG. 3 to the open position of the valve 28 responsive to upward movement of the float 16.

As seen in FIG. 2, the control valve 28 is disposed within the vessel 15 which has an opening 19 which is provided for a purpose that will be described presently.

A disk 21 is provided at the region waste liquid flows from the conduit 20 into the float chamber 71. The disk 21, which is formed with an opening 22, serves as a flow-reducing member past which waste liquid flows from the outlet 42 to the float chamber 71. The opening 22 in the disk 21 preferably is of such size that the quantity of liquid flowing from the outlet 42 to the chamber 71 in a given interval of time never exceeds the quantity of liquid sucked and withdrawn from the chamber 71 in the same given interval of time and discharged into the sewage system by the partial vacuum prevailing in the discharge conduit 23.

When the main valve 24 and control valve 28 are both closed, the float 16 will be in its lowest position in the chamber 71. Under these conditions the body of air in the chamber 71 will be at atmospheric pressure by reason of the opening 19 provided at the top of the vessel 15 and the fact that ambient air at atmospheric pressure can pass into the bottom of chamber 71 through the conduit 20 from the place 43. Since the valve member 70 is closed, a passageway for air at atmospheric pressure is established from the chamber 71 to the operating device 25 which includes the groove 42a in the cylindrical-shaped part 35, chamber 68 in the valve body 31 and conduit section 29. For this reason the main valve 24 is closed in the manner previously explained.

When the main valve 24 is closed a partial vacuum prevails at region 26 of the discharge conduit 23 which is downstream from the main valve 24. With the valve member 70 of control valve 28 in its closed position, conduit section 27 will not be in communication with the conduit section 29 and a partial vacuum will prevail only in the conduit section 27.

Let us now assume that waste liquid starts to flow from the outlet 42 of the place 43 through the conduit 20 into the float chamber 71. In a short interval of time with a relatively little rise in liquid level in the chamber 71, the liquid level will rise sufficiently to lift the float 16 and render the latter operable to effect opening of the control valve 28. This will cause the valve member 70 to move to the right in FIG. 3 and connect conduit sections 27 and 29. When this occurs the operating device 25 will be connected to the region 26 at a partial vacuum through the conduit section 27, passageway 69 and chamber 68 in the valve body 31 and the conduit section 29, whereby the main valve 24 will open in the manner previously explained.

When the main valve 24 opens the partial vacuum prevailing in the discharge conduit 23 immediately becomes effective to suck and withdraw waste liquid from the chamber 71, thereby effecting movement of the float 16 to its lowest position and closing the control valve 28. By dimensioning the opening 22 in the disk 21 to effect flow control of waste liquid in the manner explained above, the liquid flowing into the float chamber 71 will be continuously sucked out through the discharge conduit 23 and only an insignificant quantity of waste liquid will remain in the bottom of the float chamber 71. Hence, the float 16 will remain in its lowest position and control valve 28 will be closed during the entire time that waste liquid is being withdrawn from the float chamber 71 by the partial vacuum in the conduit 23.

The apertured flow-reducing member 21 also functions to prevent the pressure in the float chamber 71 from materially increasing and becoming equalized with the atmospheric pressure of ambient air enveloping the vessel 15 during removal of waste liquid from the chamber 71. Stated another way, the apertured disk 21 is so constructed and formed that waste liquid flowing from the outlet 42 to the float chamber 71 will block the flow of ambient air at atmospheric pressure therethrough sufficiently so that the partial vacuum prevailing in the conduit 24 will also mainly prevail in the float chamber 71. This operating condition is established even though the float chamber 71 has the opening 19 which provides a restricted passageway for ambient air at atmospheric pressure into the float chamber.

Hence, even after the float 16 falls to its lowest level in the chamber 71 and the valve member 70 of the control valve 28 moves against its seat to disconnect conduit section 29 from conduit section 27, the partial vacuum prevailing in the chamber 71 will function to render the operating means 25 operable to keep main valve 24 open. Under these conditions the partial vacuum in the chamber 71 will be transmitted to the main valve operating means 25 through a connection formed by the groove 42a in the cylindrical-shaped part 35, chamber 68 in the value body 31 and the conduit section 29. Hence, the main valve 24 will remain open during the entire time that waste liquid from the outlet 42 is being sucked through the discharge conduit 23 into the sewage disposal system. And, in view of the explanation just given, waste liquid will continue to be sucked out through discharge conduit 23 while the main valve 24 is open and the control valve 28 is closed due to the float 16 being in its lowest position in the chamber 71.

The main valve 24 will close only after all of the waste liquid has been sucked out of the chamber 71. When all of the waste liquid has been discharged from the place 43 and the conduit 20 is empty, ambient air at atmospheric pressure can then pass from the place 43 through conduit 20 into the chamber 71. Under these conditions the ambient air entering the chamber 71 will increase the pressure therein to such an extent that the partial vacuum in the chamber and transmitted through conduit section 29 to the device 25 will be insufficient for the latter to keep the main valve 24 open. When the main valve 24 now is closed there will be practically no waste liquid remaining in the conduit 20 and the float chamber 71.

When both the main valve 24 and control valve 28 are closed and the control valve 28 opens with upward movement of the float 16 responsive to waste liquid flowing into the float chamber 71, the partial vacuum transmitted from the region 26 of the discharge conduit 23 to the operating device 25 is of sufficient magnitude to lift the elastic valve 47 from its closed to its open position. After the elastic valve 47 is in its open position, the partial vacuum necessary to keep it open is considerably less than that required to move it to its open position. Hence, after the control valve 28 closes with movement of the float 16 to its lowest position, the main valve 24 will remain open to suck out all of the waste liquid from the float chamber 71 in the manner explained above because the partial vacuum that is maintained in the float chamber, although it is less than the partial vacuum prevailing in the region 26 of the discharge conduit 23 when the elastic valve 47 is moved to its open position, is neverthless sufficient and adequate to keep the elastic valve 47 open until all of the waste liquid has been discharged from the chamber 71 and conduit 20. When this occurs ambient air at atmospheric pressure can then pass from the place 43 through conduit 20 into the float chamber 71, as just explained, whereby the pressure in the flat chamber will increase and cause the operating device 25 to close the main valve 24.

In accordance with my invention the vessel 15 is provided with an opening 19 for mixing air with waste liquid flowing to the main conduit 10 from the sanitary convenience 43 when the main control valve 24 is open. The vessel 15 is provided with a top 17 and an overlying sealing cover 18 formed of rubber, for example, having a downward extending flange or skirt 18a.

The sealing cover 18 is formed with an elongated slot or opening 9 which is curved and the top 17 is formed with a curved row of spaced openings 8. The sealing cover 18 is turnable with respect to the top 17 so that the slot 9 will uncover one or more of the openings 8 to form the opening 19 for the vessel 15. With this arrangement the quantity of ambient air that can flow through the opening 19 into the chamber 71 by suction therein, when the main valve 24 is open, can be conveniently increased or decreased.

An important feature of my invention is that ambient air mixes with waste liquid in the float chamber 71 portion of discharge conduit 23 which is upstream from the main control valve 24. The rate at which the ambient air is drawn into the chamber 71 and mixes with waste liquid will be dependent upon the partial vacuum prevailing in the float chamber 71 when the main control valve 24 is open. The partial vacuum prevailing in the float chamber portion of each discharge conduit 23 in turn will be dependent upon the partial vacuum in the system of FIG. 1 at the region of the primary conduit 10 at which waste liquid flows thereto from each branch line 44.

The partial vacuum prevailing at each of the last-mentioned regions will be dependent upon the number of branch lines 44 having their main control valves 24 open and through which waste liquid is flowing at the same time to the main conduit 10. When the number of branch lines 44 conducting waste liquid at the same time to the main conduit 10 increases, the partial vacuum prevailing at the regions the branch lines 44 are connected to the main conduit 10 automatically decreases, whereby the rate at which ambient air drawn through each opening 19 and mixing with waste liquid decreases. Conversely, when the number of branch lines 44 conducting waste liquid at the same time to the main conduit 10 decreases, the partial vacuum prevailing at the regions the branch lines 44 are connected to the main conduit automatically increases, whereby the rate at which ambient air drawn through each opening 19 and mixing with waste liquid increases.

Accordingly, the openings 19 for mixing ambient air with waste liquid in the discharge conduits 23, by reason of their location, function automatically to vary the total quantity of ambient air that mixes with waste liquid. This means that the quantity of ambient air that mixes with waste liquid will vary from (1) a very small quantity when a large number of main control valves 24 are open and waste liquid is discharged to the main conduit 10 through the branch lines having such open valves to (2) a larger quantity when a relatively few main control valves 24 are open, such larger quantity being dependent upon the adjustment of the openings 19.

In a pneumatic sewage system the partial vacuum prevailing in the system promotes flow of waste liquid at a relatively high velocity. When waste liquid no longer is being discharged from the branch lines 44 to the main conduits 10, the long liquid column being propelled through each of the main conduits 10 stops suddenly. This produces forces of high magnitude which exercise an adverse effect on the relatively long main conduit 10 and equipment connected thereto.

By mixing air with waste liquid in the branch lines or secondary paths of flow 44 and discharging such mixtures of air and waste liquid into a main conduit 10 in the manner just explained, the air mixed with the waste liquid functions as a resilient damper that effectively absorbs the forces developed when the long column of liquid being propelled through each of the main conduits stops suddenly.

When waste liquid is being supplied to the main conduit 10 from a number of sanitary conveniences 43 at the same time, the likelihood that waste liquid will stop flowing from them at the same moment is not too great. In such case one or more main control valves 24 in the branch lines 44 will remain open and the long column of liquid being propelled through the main conduit 10 will not stop suddenly. Under these conditions the damping action required will not be as great and the quantity of ambient air mixing with waste liquid can be less.

In view of the foregoing, it will now be understood that the quantity of air mixed with waste liquid and calculated in percentage of the volume thereof is reduced in proportion to the increase in the number of branch lines 44 in open communication at the same time with the same main conduit 10, that is, with the main control valves 24 of such branch lines open.

By providing openings 19 in the upper parts of the vessels 15 which can be made larger or smaller, the rate of flow of ambient air therethrough can be adjusted to meet different operating conditions encountered in a particular installation, such as the length of each main conduit 10 of the pneumatic sewage system, for example.

I claim:

1. In a method of conducting waste liquid in a pneumatic sewage disposal system through a relatively long primary pipe line or conduit to a receiving tank under vacuum from a plurality of sanitary conveniences communicating with said primary conduit, the improvement which comprises the steps of intermittently flowing waste liquid from a plurality of sanitary conveniences to said primary conduit, and mixing air with waste liquid only during the intervals of time such liquid flows from said sanitary conveniences to said primary conduit.

2. The improvement set forth in claim 1 which comprises mixing a quantity of air with waste liquid from the sanitary conveniences which is dependent upon the volume of waste liquid flowing from the sanitary conveniences to said primary conduit and reducing the quantity of air mixed with waste liquid from the sanitary conveniences with an increase in the number of places of said primary conduit to which waste liquid is flowing at the same time from the sanitary conveniences.

3. In a pneumatic sewage disposal system having a relatively long primary path of flow for conducting waste liquid to a receiving place at a partial vacuum and a plurality of secondary paths of flow which are connected to said primary path of flow and can be closed and opened, each of said secondary paths of flow serving to conduct waste liquid intermittently from a sanitary convenience to a region of said primary path of flow, the improvement which comprises the steps of opening each secondary path of flow when waste liquid starts to flow therethrough from the sanitary convenience associated therewith and closing each secondary path of flow when such flow of waste liquid therethrough stops, and mixing air with waste liquid in each secondary path of flow only during the intervals of time waste liquid is flowing therethrough and while it is open.

4. The improvement set forth in claim 3 which comprises mixing air with waste liquid only while it is flowing in each secondary path of flow and while it is open at a rate which is dependent upon the partial vacuum in the system at the primary path of flow at which waste liquid flows thereto from each open secondary path of flow.

*5. In a method of conducting waste liquid in a pneumatic liquid disposal system through a relatively long pipe or conduit to a receiving tank under vacuum from a plurality of sanitary conveniences, the improvement which comprises conducting to a place waste liquid discharged from at least one of said sanitary conveniences, intermittently flowing waste liquid from said place to the conduit, initiating flow of waste liquid intermittently from said place to the conduit responsive to accumulation of waste liquid in said place, and flowing air into the conduit with liquid flowing from said place.*

*6. The improvement set forth in claim 5 which comprises initiating flow of waste liquid intermittently from said place to the conduit responsive to accumulation of a definite quantity of waste liquid in said place.*

*7. The improvement set forth in claim 5 which comprises initiating flow of waste liquid intermittently from said place to the conduit responsive to changes in liquid level of waste liquid accumulating in said place.*

*8. The improvement set forth in claim 5 which com-*

*prises initiating flow of waste liquid intermittently from said place to the conduit responsive to an operating condition affected by the accumulation of waste liquid in said place.*

*9. The improvement set forth in claim 5 which comprises mixing with the waste liquid flowing from said place to the conduit the air flowing into the conduit.*

*10. The improvement set forth in claim 5 which comprises conducting to said place waste liquid which is discharged by gravity from at least one of said sanitary conveniences.*

References Cited

The following references, cited by the Examiner, are of record in the patented file of this patent or the original patent.

UNITED STATES PATENTS

| | | | |
|---|---|---|---|
| 2,749,558 | 6/1956 | Lent et al. | 4—10 |
| 3,032,776 | 5/1962 | Obart et al. | 4—1 |
| 3,115,148 | 12/1963 | Liljendahl | 137—305 |
| 3,329,974 | 7/1967 | Belasco | 4—142 |
| 3,590,836 | 7/1971 | Kuntza et al. | 4—1 |
| 3,597,769 | 8/1971 | Brainard II et al. | 4—10 |
| 3,730,884 | 5/1973 | Burns et al. | 210—15 |
| 3,239,849 | 3/1966 | Liljendahl | 137—305 |

HENRY K. ARTIS, Primary Examiner

U.S. Cl. X.R.

137—205